(12) United States Patent
Prabha et al.

(10) Patent No.: US 10,671,352 B2
(45) Date of Patent: Jun. 2, 2020

(54) DATA PROCESSING PLATFORM FOR PROJECT HEALTH CHECKS AND RECOMMENDATION DETERMINATION

(71) Applicant: Accenture Global Solutions Limited, Dublin (IE)

(72) Inventors: Niju Prabha, Bangalore (IN); Sarvesh Madhusudan Damle, Thane (IN); Rajendra T. Prasad, Bangalore (IN); Shankaranand Mallapur, Mumbai (IN); Vijayaraghavan Koushik, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 14 days.

(21) Appl. No.: 15/818,461

(22) Filed: Nov. 20, 2017

(65) Prior Publication Data

US 2019/0155577 A1   May 23, 2019

(51) Int. Cl.
*G06F 9/44* (2018.01)
*G06F 8/20* (2018.01)
*G06F 11/30* (2006.01)
*G06F 11/34* (2006.01)
*G06N 20/00* (2019.01)
*G06F 9/451* (2018.01)

(52) U.S. Cl.
CPC .............. *G06F 8/20* (2013.01); *G06F 11/302* (2013.01); *G06F 11/3409* (2013.01); *G06N 20/00* (2019.01); *G06F 9/453* (2018.02)

(58) Field of Classification Search
CPC ...... G06F 8/20; G06F 11/302; G06F 11/3409; G06N 20/00

USPC ................................................ 717/104, 101
See application file for complete search history.

(56) References Cited

U.S. PATENT DOCUMENTS

| 9,875,233 | B1* | 1/2018 | Tomkins | G06F 16/3334 |
| 2007/0203912 | A1* | 8/2007 | Thuve | G06Q 10/06 |
| 2012/0109697 | A1* | 5/2012 | Hickey | G06Q 10/063 705/7.11 |
| 2012/0136695 | A1* | 5/2012 | Bagheri | G06Q 10/063 705/7.28 |

(Continued)

OTHER PUBLICATIONS

Title: Machine learning for predictive maintenance: A multiple classifier approach, author: GA Susto et al, published on 2014.*

(Continued)

*Primary Examiner* — Chameli Das
(74) *Attorney, Agent, or Firm* — Harrity & Harrity, LLP

(57) ABSTRACT

A device may predict, based on historical data relating to a plurality of past projects, a trigger to perform a project health check for a project. The device may process project data relating to the project to determine a health check status of the project based on predicting the trigger to perform the project health check for the project. The device may generate a recommendation relating to altering completion of the project based on the health check status of the project. The device may communicate with one or more devices to provide information identifying the recommendation. The device may receive, from the one or more devices, response information relating to the recommendation. The device may perform a response action relating to the recommendation based on receiving the response information.

20 Claims, 6 Drawing Sheets

(56) References Cited

U.S. PATENT DOCUMENTS

| | | | |
|---|---|---|---|
| 2015/0248532 A1* | 9/2015 | Rajasenan | G06Q 50/22 |
| | | | 705/2 |
| 2016/0110224 A1* | 4/2016 | Cao | G06F 11/3003 |
| | | | 718/104 |
| 2016/0239774 A1* | 8/2016 | Babar | G06Q 10/0637 |
| 2017/0185931 A1* | 6/2017 | Bhojan | G06Q 10/06313 |
| 2018/0218734 A1* | 8/2018 | Somech | G10L 15/16 |
| 2018/0307481 A1* | 10/2018 | Ganesan | G06F 8/71 |
| 2020/0026580 A1* | 1/2020 | Bahramshahry | G06F 9/44505 |

OTHER PUBLICATIONS

EdX Inc., "Data Science and Machine Learning Essentials", Nov. 5, 2015, 3 pages.
Courseara Inc., "Text Mining and Analytics", 2017, 5 pages.
Courseara Inc., "Natural Language Processing", 2017, 4 pages.
Grun et al., "topicmodels: An R Package for Fitting Topic Models", May 9, 2011, 20 pages.
Gesmann, "googleVis: R Interface to Google Charts", Jan. 1, 2007, 95 pages.
Jperraud, "R.NET—CodePlex", Aug. 9, 2015, 2 pages.
2015 j-m, "R.NET documentation—user version", Oct. 31, 2015, 1 page.

\* cited by examiner

DATA PROCESSING PLATFORM FOR PROJECT HEALTH CHECKS AND RECOMMENDATION DETERMINATION

BACKGROUND

Software development may involve an end-to-end process of creating software programs for a system, embodying stages throughout a system's development life cycle. Software project management may involve planning and managing software projects, and may include involvement of end users, communication among customers/clients, users, and software developers; articulation of project goals; accurate estimation of resources; and/or specification of system requirements. Project management software may be used to help plan, organize, schedule, budget, communicate, make decisions, and/or the like.

SUMMARY

According to some possible implementations, a device may include one or more processors. The one or more processors may predict, using a prediction module, based on historical data relating to a plurality of past projects, a trigger to perform a project health check for a project. The one or more processors may process, using an issue identification module and using natural language processing technique or a machine learning technique, project data relating to the project to determine a health check status of the project based on predicting the trigger to perform the project health check for the project. The natural language processing technique or the machine learning technique may be used to parse textual data relating to at least one of an error, an alert, or a requirement. The health check status of the project may be selected from a plurality of possible health check statuses. The one or more processors may generate, using a recommendation module, a recommendation relating to altering completion of the project based on the health check status of the project. The recommendation may be to alter the health check status to another health check status. The one or more processors may communicate, using a presentation module, with one or more other devices to perform a response action based on the recommendation.

According to some possible implementations, a method may include detecting, by a device, a trigger to perform a project health check for a project. The method may include obtaining, by the device, project data relating to the project. The project data may include first data associated with a plurality of other projects and second data associated with the project. The project data may include at least one of transactional data, ordering data, log file data, product classification data, task classification data, user skill proficiency data, human resources data, or company data. The method may include processing, by the device, project data relating to the project to determine a health check status of the project based on predicting the trigger to perform the project health check for the project. The health check status of the project may be selected from a plurality of possible health check statuses for the plurality of other projects. The method may include generating, by the device, a recommendation relating to altering completion of the project based on the health check status of the project. The recommendation may be to alter the health check status to another health check status. The method may include communicating, by the device, with one or more other devices to perform a response action based on the recommendation According to some possible implementations, a non-transitory computer-readable medium may store instructions. The one or more instructions, when executed by one or more processors, may cause the one or more processors to predict, based on historical data relating to a plurality of past projects, a trigger to perform a project health check for a project. The one or more instructions, when executed by one or more processors, may cause the one or more processors to process project data relating to the project to determine a health check status of the project based on predicting the trigger to perform the project health check for the project. The health check status of the project may be selected from a plurality of possible health check statuses. The one or more instructions, when executed by one or more processors, may cause the one or more processors to generate a recommendation relating to altering completion of the project based on the health check status of the project. The recommendation may be to alter the health check status to another health check status. The one or more instructions, when executed by one or more processors, may cause the one or more processors to communicate with one or more devices to provide information identifying the recommendation. The one or more instructions, when executed by one or more processors, may cause the one or more processors to receive, from the one or more devices, response information relating to the recommendation. The one or more instructions, when executed by one or more processors, may cause the one or more processors to perform a response action relating to the recommendation based on receiving the response information.

DETAILED DESCRIPTION

The following detailed description of example implementations refers to the accompanying drawings. The same reference numbers in different drawings may identify the same or similar elements.

A software development project may include multiple phases, and may be completed by multiple people. For example, the software development project may include a requirements gathering phase, a requirements analysis phase, a project planning phase, a software development phase, a testing phase, and a publishing phase. Additionally, or alternatively, after an initial publishing phase, the software development project may include an update phase, a service phase (e.g., where a software developer may receive trouble tickets regarding a project, and may resolve the trouble tickets), and/or the like. The multiple phases may be completed and/or may involve managers, software developers, testers, customer service representatives, clients, consultants, and/or the like. Project management software may be used to plan, organize, and manage the software development project. In some cases, project management software may be responsive to errors occurring in the project. For example, project management software may determine that a project phase is behind schedule, and may provide an alert regarding the schedule. However, when the project is already behind schedule, it may be difficult to adjust the schedule to correct deficiencies.

Some implementations, described herein, may include a project preventative intervention system (i.e., a preventive intervention system for software projects). For example, a health check platform may periodically perform health checks of a project, and may proactively identify a health check status of the project to enable proactive alerts and recommendations for avoiding deficiencies in the project. In this way, computing resources associated with the project may be reduced by avoiding inefficient scheduling changes, project revisions, and/or the like after deficiencies have already occurred. Moreover, based on automatically providing alerts and recommendations and based on automatically implementing some recommendations, computing resources may be reduced relative to inefficient human-based project management, which may require excessive and resource consuming interaction with user interfaces.

Figure 1A:
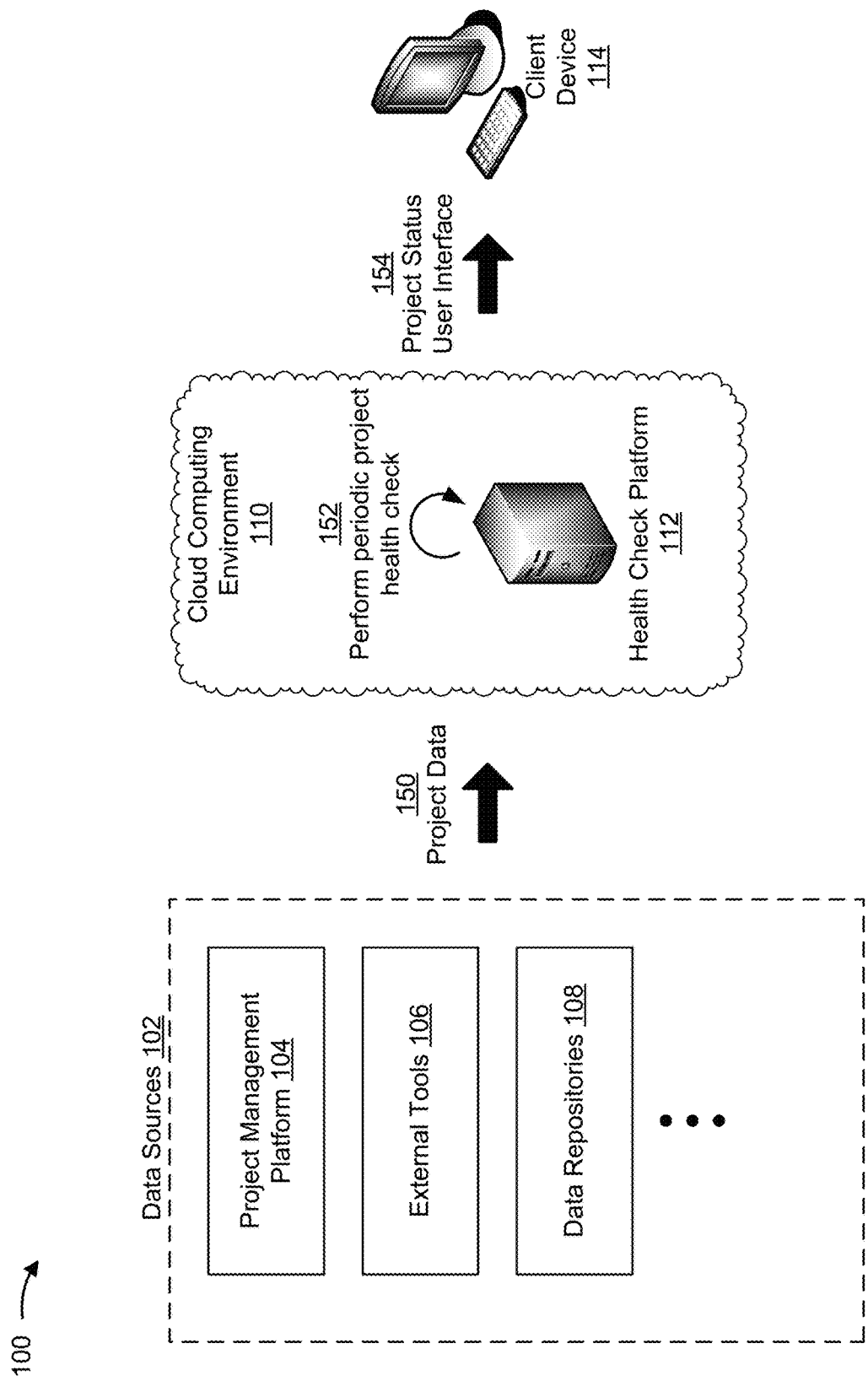
FIGS. 1A and 1B are diagrams of an overview of an example implementation described herein.
Figure 1B:
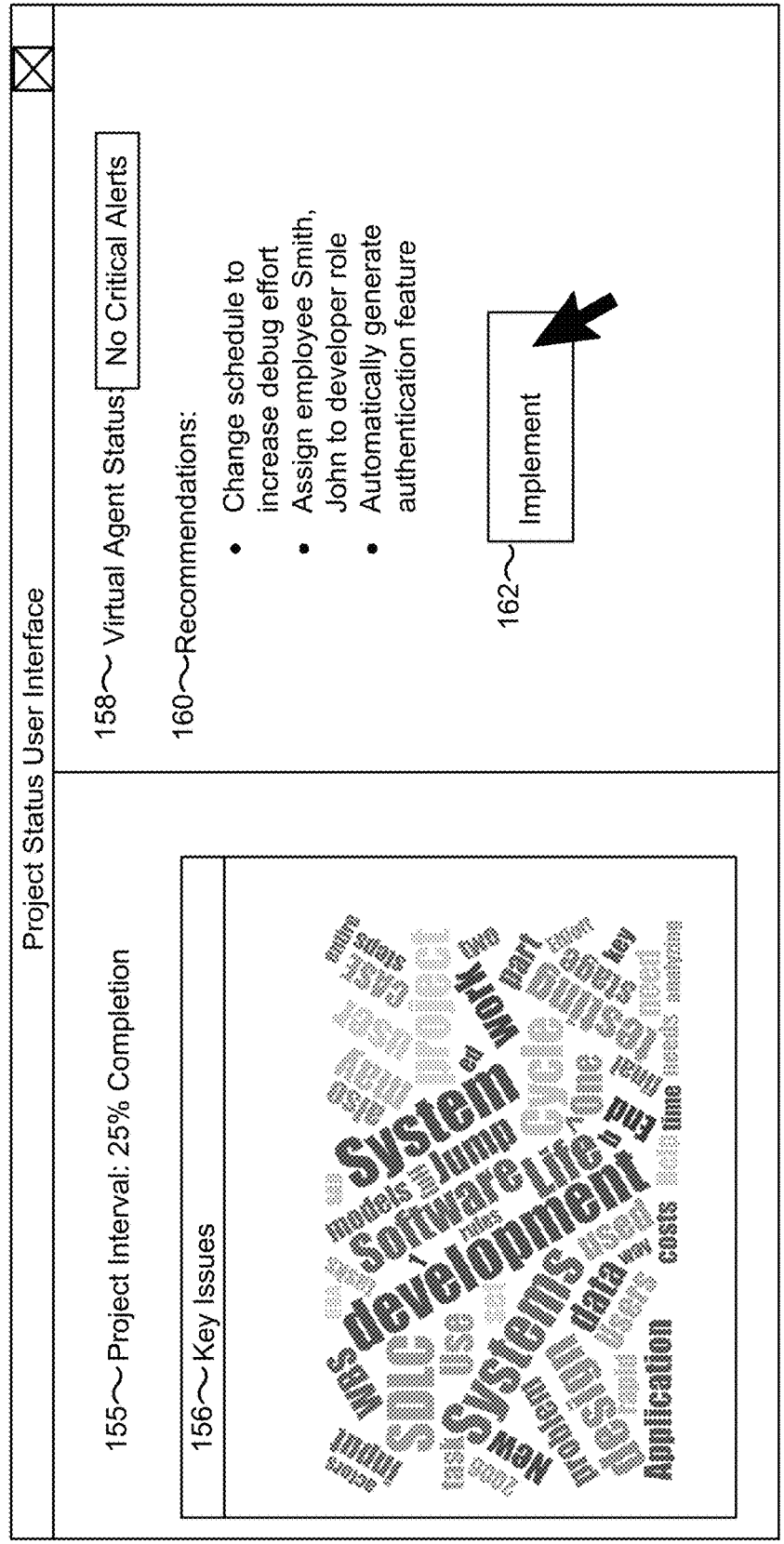

FIGS. 1A and 1B are diagrams of an overview of an example implementation 100 described herein. As shown in FIG. 1A, example implementation 100 may include data sources 102. Data sources 102 may include project management platform 104 for managing a project, external tools 106 for integration into project management platform 104 (e.g., other tools providing other functionalities that project management platform 104 does not provide), and data repositories 108 that include data about other projects, about companies, or the like. Example implementation 100 may further include cloud computing environment 110 (which may include health check platform 112), and client device 114.

As further shown in FIG. 1A, and as shown by reference number 150, health check platform 112 may receive project data from data sources 102. As shown by reference number 152, health check platform 112 may perform a project health check. For example, health check platform 112 may classify a project into a heath check status (e.g., "good," "under control," "alert," "critical alert," etc.) based on one or more thresholds (e.g., threshold errors, threshold alerts, threshold schedule deviation, threshold budget deviation, threshold user complaints, etc.). As shown by reference number 154, health check platform 112 may generate a project status user interface, and may provide the project status user interface to client device 114 and/or cause client device 114 to display the user interface.

As shown in FIG. 1B, and as shown by reference number 155, the project status user interface may identify a project interval (shown as "25% completion") that triggered performance of the health check. As shown by reference number 156, the project status user interface may further identify key issues (e.g., in the form of a word cloud of words from previously identified issues and alerts). As shown by reference number 158, the project status user interface may further identify a status of a virtual agent. For example, health check platform 112 may provide the virtual agent (e.g., using natural language processing techniques, text generation techniques, text vocalization techniques, voice to text determination techniques, etc.) to enable a natural language interaction with a user to provide recommendations.

As shown by reference number 160, the project status user interface may identify recommendations (shown as "Change schedule to increase debug effort", "Assign employee Smith, John to developer role", and "Automatically generate authentication feature"). As shown by reference number 162, the project status user interface may identify an option to implement recommendations based on user approval. In some cases, health check platform 112 may automatically implement one or more of the recommendations (e.g., cause one or more tasks to be automatically and/or manually completed).

In this way, computing resources associated with the project may be reduced by avoiding inefficient scheduling changes, project revisions, and/or the like after deficiencies have already occurred. Moreover, based on automatically providing alerts and recommendations and based on automatically implementing some or all of the recommendations, computing resources may be reduced relative to inefficient human-based project management, which may require excessive and resource consuming interaction with user interfaces and a trial and error approach to solving issues with the project.

As indicated above, FIGS. 1A and 1B are provided merely as an example. Other examples are possible and may differ from what was described with regard to FIGS. 1A and 1B.

Figure 2A:
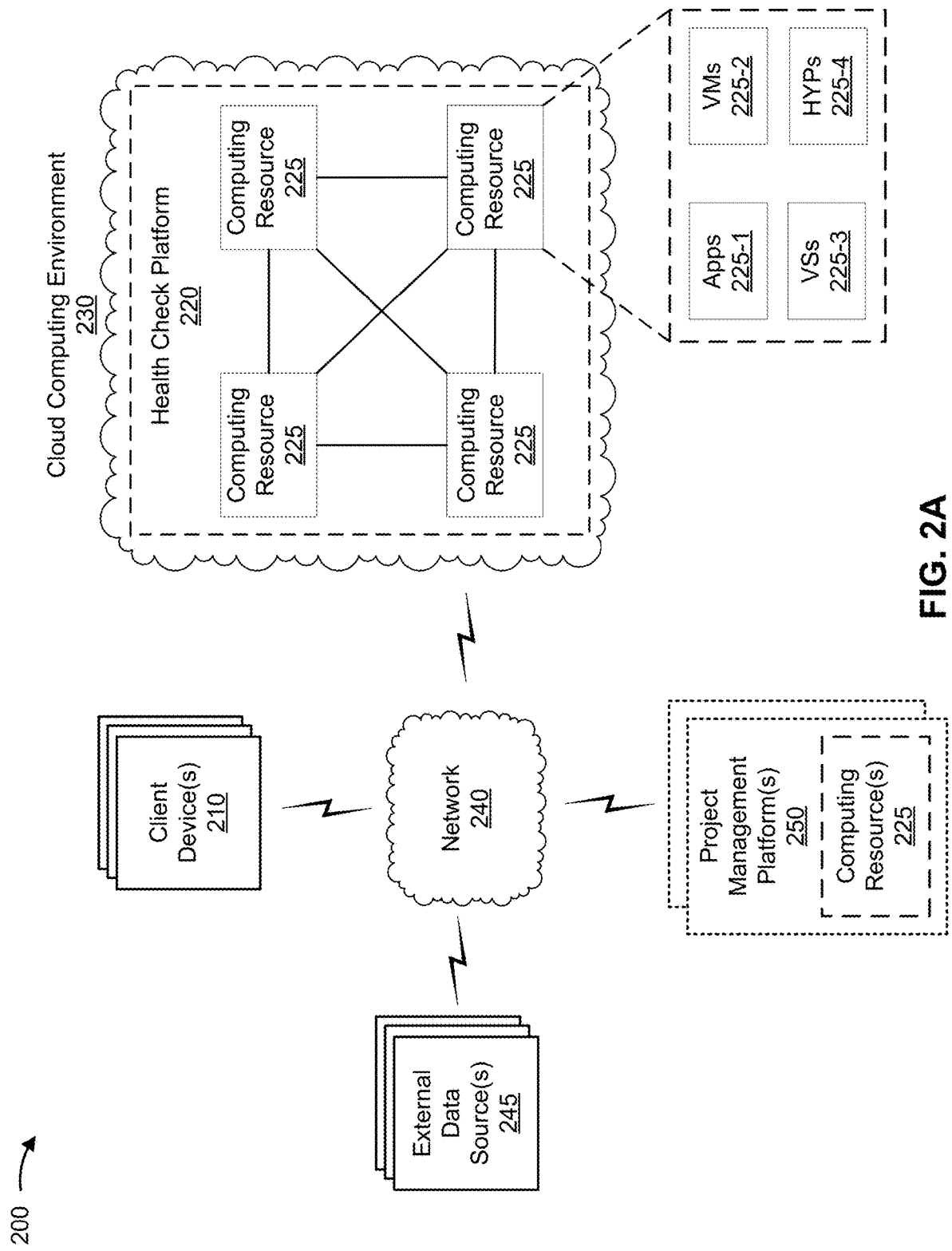
FIGS. 2A and 2B are diagrams of an example environment in which systems and/or methods, described herein, may be implemented.
Figure 2B:
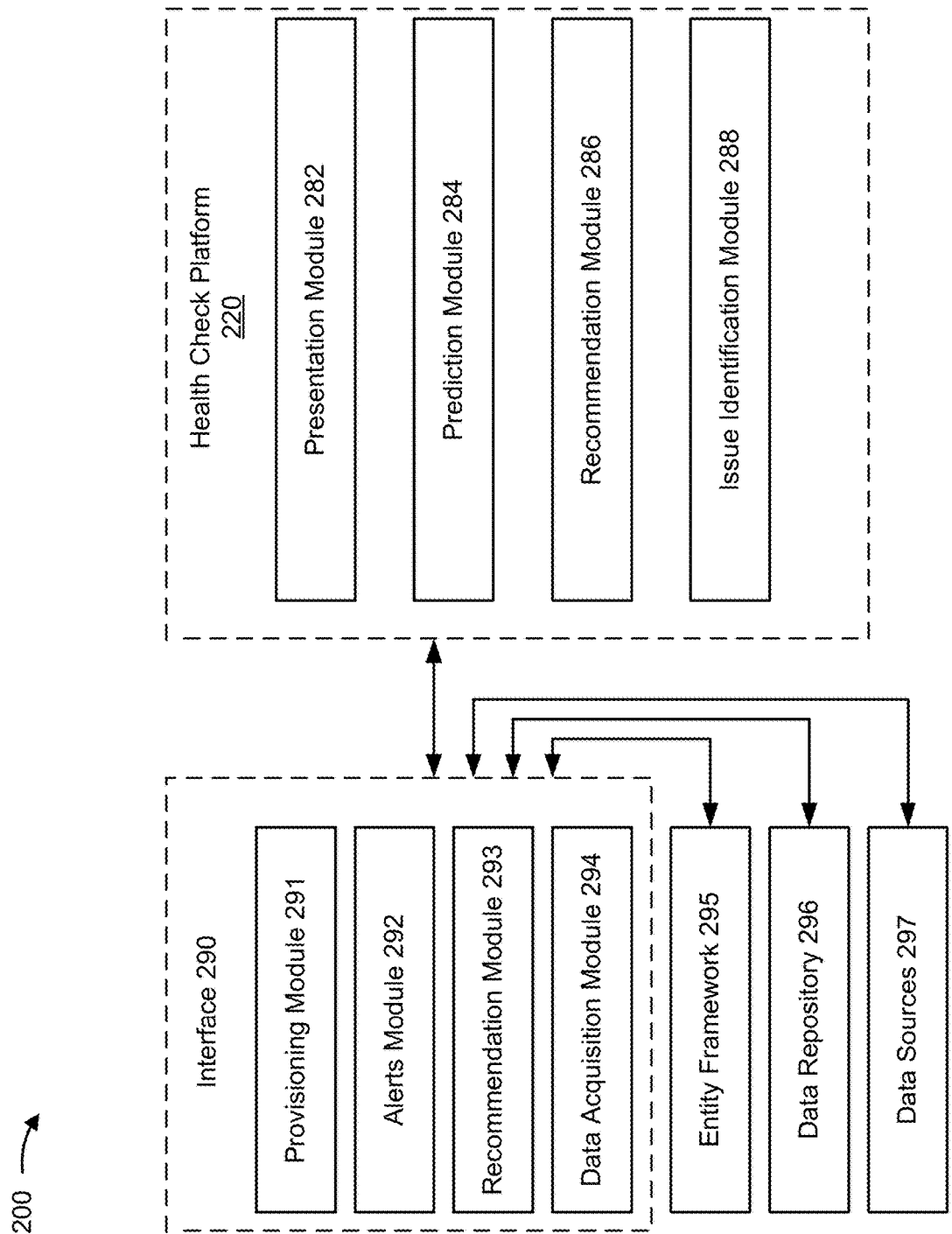

FIGS. 2A and 2B are diagrams of an example environment 200 in which systems and/or methods, described herein, may be implemented. As shown in FIG. 2A, environment 200 may include a client device 210, a health check platform 220 inside a cloud computing environment 230, a network 240, an external data source(s) 245, and a project management platform 250. Devices of environment 200 may interconnect via wired connections, wireless connections, or a combination of wired and wireless connections.

Client device 210 includes one or more devices capable of receiving, generating, storing, processing, and/or providing information associated with a project health check. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Health check platform 220 includes one or more devices capable of receiving, generating, storing, classifying, processing, and/or providing information associated with performing a project health check, as described elsewhere herein. For example, health check platform 220 may include a cloud server or a group of cloud servers. In some implementations, health check platform 220 may communicate with client device 210 to provide information associated with a health check, such as a report, a recommendation, or the like. Additionally, or alternatively, health check platform 220 may communicate with project management platform 250 and/or external data sources 245 to obtain project information (e.g., source code relating to a project, information identifying a set of tickets for resolution, etc.). In some implementations, health check platform 220 corresponds to health check platform 112 shown in FIG. 1A.

In some implementations, as shown, health check platform 220 may be hosted in cloud computing environment 230. Notably, while implementations described herein describe health check platform 220 as being hosted in cloud computing environment 230, in some implementations, health check platform 220 may not be cloud-based (i.e., may be implemented outside of a cloud computing environment) or may be partially cloud-based. Although implementations are described herein as performing a health check relating to a software development project environment, health check platform 220 may be utilized to classify and resolve issues relating to other environments, such as a corporate environment, a governmental environment, an educational environment, and/or the like.

Cloud computing environment 230 includes an environment that delivers computing as a service, whereby shared resources, services, etc. may be provided to host health check platform 220. Cloud computing environment 230 may provide computation, software, data access, storage, and/or other services that do not require end-user knowledge of a physical location and configuration of a system and/or a device that delivers the services. As shown, cloud computing environment 230 may include a health check platform 220, a computing resource 225, Apps 225-1, VMs 225-2, VSs 225-3, and HYPs 225-4.

Computing resource 225 includes one or more personal computers, workstation computers, server devices, or another type of computation and/or communication device. In some implementations, computing resource 225 may host health check platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2A, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with health check platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

External data source 245 includes a computing platform, such as another cloud computing environment 230, a non-cloud computing based computing platform, and/or the like that provides data. For example, external data source 245 may include a server providing data regarding a ticket tracking tool, a defect management tool, an agile workflow tool, an artificial intelligence (AI) tool, a machine learning tool, an analytics tool, and/or the like. Additionally, or alternatively, external data source 245 may include a data structure providing information regarding other projects, such as data identifying a resource utilization associated with automated task completion or manual task completion for another project. In some implementations, external data source 245 may operate on client device 210. For example, client device 210 may include one or more tools that execute on client device 210, which may provide computing resources 225 for the one or more tools and which may provide data regarding execution of the one or more tools and/or utilization of client device 210. In some implementations, external data source 245 may include a sensor, and may provide sensor data for use in determining a project health check. For example, external data source 245 may include a keystroke sensor, a motion detector, or the like to determine user activity to complete a project. Similarly, external data source 245 may include a sensor for which software is being developed, and may provide sensor data which may be analyzed to determine whether the software is functioning correctly or includes errors. In some implementations, external data source 245 corresponds to external tools 106, data repositories 108, or the like shown in FIG. 1A.

Project management platform 250 includes one or more devices capable of receiving, generating, storing, classifying, processing, and/or providing information associated with a project (e.g., a software development project), as described elsewhere herein. For example, project management platform 250 may include a cloud server or a group of cloud servers to perform a development operation, a maintenance operation, a testing operation, a management operation, or the like for a project based on a project plan (e.g., an assignment of the project management platform 250 to perform operations for one or more tasks of a project). In some implementations, project management platform 250 may communicate with client device 210 to obtain project information (e.g., source code relating to a project). Additionally, or alternatively, project management platform 250 may communicate with project management platform 250 to provide information to and/or obtain information from a tool operated by project management platform 250 (e.g., an artificial intelligence tool, another project management tool not co-located with project management platform 250, etc.). In some implementations, project management platform 250 corresponds to project management platform 104 shown in FIG. 1A.

In some implementations, as shown, project management platform 250 may be hosted in cloud computing environment 230. Notably, while implementations described herein describe project management platform 250 as being hosted in cloud computing environment 230, in some implementations, project management platform 250 may not be cloud-based (i.e., may be implemented outside of a cloud computing environment) or may be partially cloud-based.

As shown in FIG. 2B, project management platform 250 includes a presentation module 282 (e.g., an SQL server, a C # server, a web application programming interface, and/or the like to provide a user interface), a prediction module 284 (e.g., an Azure Machine Learning module to perform predictions relating to a project), a recommendation module 286 (e.g., an R based statistical software module to generate recommendations relating to predictions based on data relating to projects), and an issue identification module 288 (e.g., an R based statistical software module to identify project issues based on data relating to projects), which are each implemented by resources of health check platform 220 (e.g., computing resources 225).

As further shown in FIG. 2B, project management platform 250 may communicate with interface 290, which may include provisioning module 291 (e.g., to provision a project), alerts module 292 (e.g., to provide alerts), recommendation module 293 (e.g., to provide recommendations), and data acquisition module 294 (e.g., to obtain data regarding a project, a user, and/or the like), and which may provide a web-based interface for utilizing health check platform 220 (e.g., via client device 210). Health check platform 220 may also communicate, via interface 290 with entity framework 295 (e.g., an interface for data repository 296), data repository 296 (e.g., a database or data lake storing categorized, classified, and/or altered data regarding projects), and data sources 297 (e.g., data sources from which data for storage in data repository 296 may be obtained, and which may correspond to external data sources 245, project management platform 250, and/or the like).

The number and arrangement of devices and networks shown in FIGS. 2A and 2B are provided as an example. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
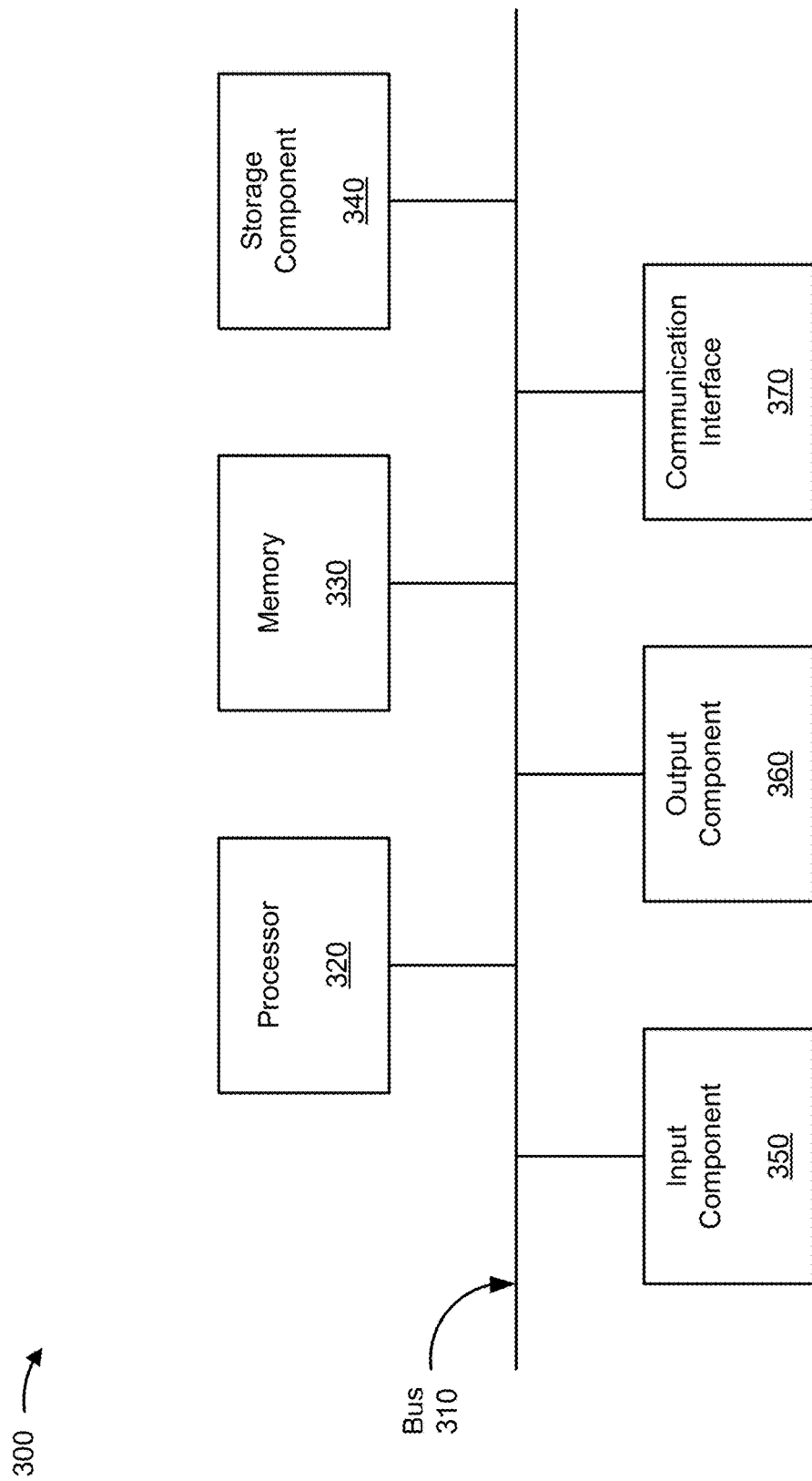
FIG. 3 is a diagram of example components of one or more devices of FIGS. 2A and 2B.

FIG. 3 is a diagram of example components of a device 300. Device 300 may correspond to client device 210, health check platform 220, external data source(s) 245, and/or project management platform(s) 250. In some implementations, client device 210, health check platform 220, external data source(s) 245, and/or project management platform(s) 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
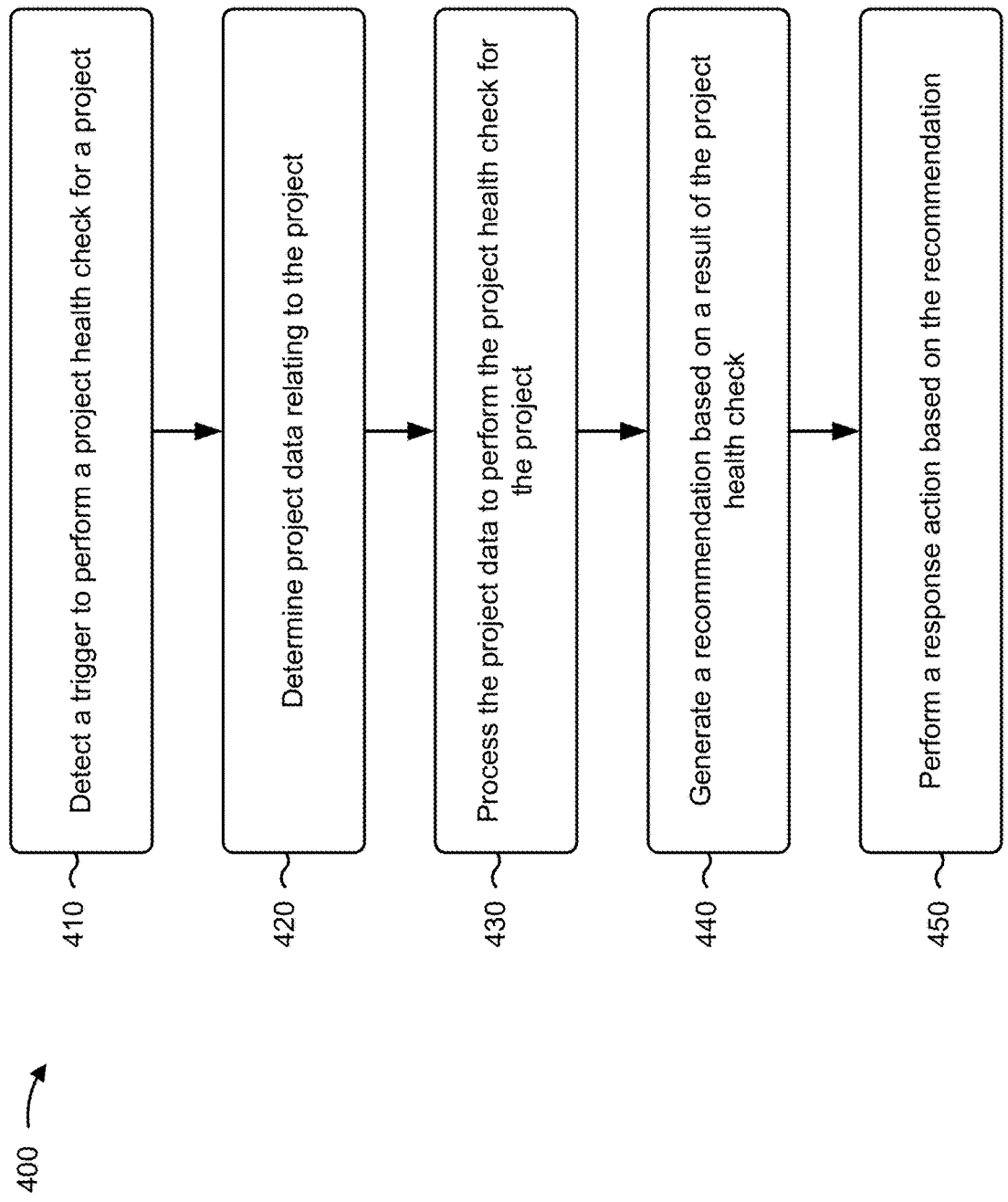
FIG. 4 is a flow chart of an example process for project health checking.

FIG. 4 is a flow chart of an example process 400 for performing a health check for a project. In some implementations, one or more process blocks of FIG. 4 may be performed by health check platform 220. In some implementations, one or more process blocks of FIG. 4 may be performed by another device or a group of devices separate from or including health check platform 220, such as client device 210 and project management platform(s) 250.

As shown in FIG. 4, process 400 may include detecting a trigger to perform a project health check for a project (block 410). For example, health check platform 220 may detect a trigger to perform a project health check for a project. In some implementations, a project may include agile development, agile management, testing, custom development, and/or other types of projects.

In some implementations, health check platform 220 may detect a trigger periodically (e.g., once per day, once per week, once per month, etc.). Additionally, or alternatively, health check platform 220 may detect a trigger at a particular completion percentage (e.g., a percentage of lines of code, a percentage of requirements satisfied, etc.).

In some implementations, health check platform 220 may detect a trigger based on predictive analytics regarding project progress. For example, health check platform 220 may determine, based on project data, a predicted completion percentage, and may detect a trigger at threshold predicted completion percentages (e.g., 25%, 50%, 75%, 100%, etc.). In some implementations, the prediction may be based on stored data regarding similar projects (e.g., projects determined to be similar based on similar project type, company, industry, etc.).

In some implementations, health check platform 220 may use project data to train a model using machine learning to identify when to trigger a health check. For example, health check platform 220 may train a model before initiation of a project using historical data relating to other projects (e.g., other similar projects associated with a threshold similarity score relating to similarity with regard to project type, delivery type, industry type, etc.) and set trigger points or intervals for triggering the health check. In this case, health check platform 220 may identify satisfaction of the trigger points as the project progresses, and may initiate the project health check based on identifying satisfaction of the trigger points. For example, each interval may correspond to a level of completion of the project, such as 25%, 50%, 75%, etc., and health check platform 220 may predict the level of completion and initiate the project health check.

In this way, health check platform 220 may detect a trigger to perform a project health check for a project, which may enable health check platform 220 to determine project data relating to the project, as described herein.

As further shown in FIG. 4, process 400 may include determining project data relating to the project (block 420). For example, health check platform 220 may determine project data relating to the project based on detecting the trigger.

In some implementations, the project data may include historical data regarding other projects. In some implementations, health check platform 220 may filter data based on a similar project, company, industry, or the like, to determine the project data. In some implementations, health check platform 220 may anonymize data, may alter a format of data (e.g., to enable processing of the data), may identify outlier data points and discard the outlier data points (e.g., to reduce a likelihood of errors affecting results of processing the data), or the like, to determine the project data.

In some implementations, health check platform 220 may obtain project data from project management platform 250. For example, health check platform 220 may obtain project data identifying a utilization of project management platform 250 (e.g., applications utilized, automated tasks completed, manually completed tasks using tools of project management platform 250, computing resource utilization, etc.), project data relating to completion of the project (e.g., tasks completed, tickets resolved, ticket resolution cycle times, code accuracy, labor costs, etc.), and/or the like. In some implementations, health check platform 220 may obtain project data from external data sources 245. For example, health check platform 220 may obtain data identifying other projects and/or project data thereof (e.g., resource utilization for tasks relating to other projects), data identifying utilization of tools not co-located with project management platform 250 in a cloud computing environment 230, or the like.

In some implementations, health check platform 220 may obtain particular types of data. For example, health check platform 220 may obtain transactional data, ordering data, log file data, product classification data, task classification data, user skill proficiency data, human resources data, company data, energy price data (e.g., data identifying a cost of using computing resources to complete a task, generate code, analyze a project, and/or the like), computing resource price data (e.g., data identifying a cost of obtaining computing resources to complete a task, generate code, analyze a project, and/or the like), and/or the like. For example, health check platform 220 may access an online repository storing data regarding a task, a project, an application, a market, and/or the like, and may obtain data from the online repository. Additionally, or alternatively, health check platform 220 may monitor utilization of a form (e.g., a software development coding tracking form, a time sheet, and/or the like) to obtain data regarding the utilization of the form or data entered into the form. Similarly, health check platform 220 may use a data acquisition agent installed on another system (e.g., client device 210) to passively collect data regarding the other system for use in performing project health checks, a user interface monitoring agent installed to passively collect data regarding utilization of a user interface (e.g., to infer resource utilization by another system generating the user interface or providing data to populate the user interface), or the like. Additionally, or alternatively, health check platform 220 may communicate with a sensor device to determine resource utilization (e.g., a temperature sensor, a central processing unit usage sensor, a memory usage sensor, a keystroke logger, a motion detector, and/or the like. In this way, health check platform 220 may determine resource utilizations and resource costs associated with each completed task of the project.

In some implementations, health check platform 220 may provide a user interface to client device 210 to permit a user to specify project data. Additionally, or alternatively, health check platform 220 may process a document (e.g., a design document, a requirements document, etc.) using natural language processing (NLP), machine learning (ML), artificial intelligence (AI), and/or the like, to extract project data. Additionally, or alternatively, health check platform 220 may crawl the web, perform API calls, identify similar projects, and/or the like to obtain data regarding similar projects. In some implementations, health check platform 220 may classify another project as similar to a project based on a type of client, a size of a client, an industry of a client, a set of requirements, and/or the like.

In some implementations, health check platform 220 may process project data to determine a type of a project or classify the project. For example, health check platform 220 may use analytics tools (e.g., a rules engine, a cognitive computing engine, etc.) trained on a training set of data regarding projects to analyze the project and a group of other projects, generate a score for the group of other projects representing a similarity to the project, and select one or more projects with a threshold score as similar projects. In some implementations, health check platform 220 may classify a project as a similar project based on geography, industry, technology, a combination thereof, etc. In this case, health check platform 220 may select data relating to similar projects, similar companies, similar clients, or the like for performing a project health check. In some implementations, health check platform 220 may determine rules for a rules engine based on a delivery type (e.g., agile delivery, application delivery, application maintenance, factory management, etc.), based on a rubric for the delivery type, and/or the like. In some implementations, health check platform 220 may analyze thousands, hundreds of thousands, and/or the like of prior projects to train a cognitive computing engine (e.g., using one or more big data techniques).

In this way, health check platform 220 may determine project data relating to a project based on detecting the trigger to perform a project health check for the project, which may enable health check platform 220 to process the project data to perform the project health check, as described herein.

As further shown in FIG. 4, process 400 may include processing the project data to perform the project health check for the project (block 430). For example, health check platform 220 may process the project data to perform the project health check and determine a health check status of the project.

In some implementations, health check platform 220 may use machine learning to process the project data to determine the health check status. In some implementations, health check platform 220 may process the data using a model (e.g., a natural language processing model) that is trained using thousands, millions, or billions of data points regarding projects. In some implementations, health check platform 220 may separate data into multiple portions to train machine learning. For example, health check platform 220 may split data into 70% for training and 30% for testing to generate a model of project development, a model of project management, or the like to identify deviations from an intended project development path for a current project. In some implementations, health check platform 220 may use a logistic regression algorithm to process the project data.

As an example, health check platform 220 may use energy price data to predict a future cost of completing a task and predict a cost overrun as a result of a change to energy prices for operating computing resources. Similarly, health check platform 220 may use computing resource price data to identify a cost to allocating computing resources to completing a task and predict a cost overrun as a result of allocating computing resources to a task. Similarly, health check platform 220 may use organization level data, demographic data, data relating to the project, and/or the like to predict a project phase (e.g., whether the project is 25% completed, 50% completed, 75% completed, 100% completed), generate a word cloud of issues relating to a particular time scale (e.g., an entire project timeline, an organizational timeline, a current month, a previous month, a particular day), generate a graphic identifying one or more topics, issues, or the like from alerts, requirements documents, organizational press releases, organizational employee documents, etc., and/or the like.

In some implementations, health check platform 220 may process the project data to generate a word cloud. For example, health check platform 220 may generate a word cloud based on textual data regarding previous recommendations, previous alerts, or the like (e.g., during a most recent 1 month, 3 months. etc.). In some implementations, health check platform 220 may use a text mining tool or text processing technique to analyze textual data (e.g., an R-based text mining model) to determine a project error based on mining project data). For example, health check platform 220 may determine a word (e.g., "requirement") that occurs at a threshold frequency and may determine to recommend that requirements be reassessed, as the requirements are likely to be causing frequent errors and are being cited in frequent recommendations.

In some implementations, health check platform 220 may classify a project into a particular health check status (e.g., good, under control, alert, critical alert, or other types of classifications) based on processing the project data. In this case, each classification may correspond to one or more thresholds (e.g., threshold errors, threshold alerts, threshold schedule deviation, threshold budget deviation, threshold user complaints, etc.). In this case, classification may relate to predicted future status of a project. For example, the project may be currently on time but expected to fall behind based on a particular circumstance). As another example, the project may be currently under a threshold error rate and/or over a threshold deliverables rate, but expected to fail the threshold based on a projected subsequent error rate (e.g., where a project gets more complex, errors increase, etc.), a projected change in requirements, a projected length of subsequent deliverables, and/or the like. In some implementations, health check platform 220 may utilize previous classifications other projects to select a health check status for the project from a set of possible health check statuses.

In some implementations, health check platform 220 may train an alert engine to identify alerts. For example, health check platform 220 may train an alert engine using machine learning, predictive analytics, pattern recognition, or the like. In some implementations, health check platform 220 may use human-assisted machine learning (e.g., may learn based on past alerts) to train a recommendation engine in less time/with less computing resources. In some implementations, health check platform 220 may predict delivery risks for milestones within a next upcoming project phase, subsequent project phases, or the like.

In this way, health check platform 220 may process the project data to perform the project health check, which may enable health check platform 220 to generate a recommendation based on a result of the project health check, as described herein.

As further shown in FIG. 4, process 400 may include generating a recommendation based on a result of the project health check (block 440). For example, health check platform 220 may generate one or more recommendations based on a result of the project health check. In some implementations, the recommendation(s) may indicate one or more response actions to be performed, such as to respond to errors occurring in the project, a determination that the project is behind schedule, and/or the like.

In some implementations, health check platform 220 may train a recommendation engine to generate the recommendation. For example, health check platform 220 may train the recommendation engine using machine learning, predictive analytics, pattern recognition, and/or the like. In some implementations, health check platform 220 may use human-assisted machine learning (e.g., learning based on past human interventions) to train the recommendation engine in less time and/or with less computing resources as compared to training a recommendation engine with using human-assisted machine learning.

In some implementations, health check platform 220 may generate the recommendation based on a recommendation model. For example, health check platform 220 may use latent Dirichlet allocation for topic modeling to identify issues and actions for a project based on a word cloud of words in past alerts and recommendations for the project.

In this way, health check platform 220 may generate a recommendation based on a result of the project health check, which may enable health check platform 220 to perform a response action based on the recommendation.

As further shown in FIG. 4, process 400 may include performing a response action based on the recommendation (block 450). For example, health check platform 220 may perform one or more response actions based on one or more recommendations.

In some implementations, health check platform 220 may generate and/or alter a user interface to include information associated with the project health check. In some implementations, health check platform 220 may provide the recommendation for display as a response action based on generating the recommendation. For example, health check platform 220 may generate and/or alter a user interface provided via client device 210 to cause the user interface to include the recommendation. In some implementations, health check platform 220 may receive, based on providing information for display in a user interface, response information identifying a user interaction with the user interface, with a virtual agent, or the like. In this case, health check platform 220 may implement the recommendation based on the response information.

In some implementations, health check platform 220 may automatically implement the recommendation. For example, health check platform 220 may communicate with external data sources 245, project management platform 250, client device 210, or the like to cause a task to be automatically completed, to cause a task to be manually completed, or the like. In this way, health check platform 220 automatically reduces a utilization of resources relating to task completion based on performing project health checks.

In some implementations, health check platform 220 may perform a response action to trigger a virtual agent functionality. For example, health check platform 220 may trigger the virtual agent based on a status of a project satisfying a threshold criticality, a status of a portion of a project satisfying a threshold criticality, or the like. In this case, health check platform 220 may provide the virtual agent (e.g., using natural language processing techniques, text generation techniques, text vocalization techniques, voice to text determination techniques, etc.) to enable natural language interaction with a user to provide recommendations. In some implementations, health check platform 220 may communicate with another computing system to trigger the virtual agent. For example, project management platform 250 may provide the virtual agent, and health check platform 220 may communicate with project management platform 250 to trigger the virtual agent.

In some implementations, health check platform 220 may perform a response action to perform a delivery review to alter the project. For example, health check platform 220 may schedule a meeting for stakeholders (e.g., developers, managers, client, etc.) to discuss a project, requirements, alerts, and/or the like. In this case, health check platform 220 may automatically schedule a meeting in a calendar, provide an alert regarding the meeting, reserve a conference room for the meeting, or the like. In some implementations, health check platform 220 may automatically perform the delivery review using an artificial intelligence technique and provide an alert regarding results of the delivery review. In this case, health check platform 220 may automatically implement an alteration to the project based on the results of the delivery review, such as by selecting an alteration to a similar project from a set of alterations to a set of similar projects (e.g., based on determining that a result of the alteration was a change to the similar project that is desired for the project, such as a schedule change, a health check status change, and/or the like).

In some implementations, health check platform 220 may perform a response action to generate code. For example, health check platform 220 may generate code using a code generation technique, may identify code in a similar project to copy and/or adapt the project, or the like. In some implementations, health check platform 220 may automatically generate and/or include authentication code to solve an identified security issue. In some implementations, health check platform 220 may identify other projects with similar health check status and provide information identifying interventions for the other projects. In this case, health check platform 220 may use machine learning to identify similarity between health check statuses.

In some implementations, health check platform 220 may perform a response action to change a schedule, change work assignments, change a role (e.g., developer to manager), and/or to perform other functions. As examples, a response action may include providing an alert, generating a calendar event (e.g., for a meeting relating to a recommendation), assigning a task to a developer, assigning developers to a shift, causing project management platform 250 to perform a task, altering a resource selected for a project (e.g., switching an artificial intelligence resource from a first artificial intelligence resource, such as Google Analytics, to a second artificial intelligence resource, such as Cortana to reduce a resource utilization), causing project management platform 250 to generate program code to automate a task or to complete a software development task (e.g., using a code generation tool), generating a user interface, providing information in a user (e.g., a query from a virtual agent, a response from a virtual agent, etc. based on an artificial intelligence technique being used), providing a report (e.g., identifying summary information for a project, team-specific resource savings data, user-specific resource savings data, etc.), and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations, described herein, may include a project preventive intervention system. For example, health check platform 220 may periodically perform health checks of a project, and may proactively identify a health check status of the project to enable proactive alerts and recommendations for avoiding deficiencies in the project. In this way, computing resources associated with the project may be reduced by avoiding inefficient scheduling changes, project revisions, and/or the like after deficiencies have already occurred. Moreover, based on automatically providing alerts and recommendations and based on automatically implementing some recommendations, computing resources may be reduced relative to inefficient human-based project management, which may require excessive and resource consuming interaction with user interfaces.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
determine, before initiation of a project, a set of intervals for performing a project health check,
the set of intervals corresponding to percentages of completion of the project;
predict, using a prediction module, based on historical data relating to a plurality of past projects, a trigger to perform the project health check for the project,
where the one or more processors, when predicting the trigger, are to:
predict satisfaction of an interval of the set of intervals;
select, from the plurality of past projects, one or more other projects associated with a threshold similarity score relating to a similarity with the project,
the threshold similarity score relating to similarity with regard to one or more of:
project type,
agile delivery type,
industry type,
geography, or
technology;
process, using an issue identification module and using a natural language processing technique or a machine learning technique, first data relating to the project to determine a health check status of the project based on predicting the trigger to perform the project health check for the project,
one or more of the natural language processing technique or the machine learning technique being used to parse textual data relating to one or more of an error, an alert, or a requirement, and
the health check status of the project being selected from a plurality of possible health check statuses;
generate, using a recommendation module, a recommendation relating to altering completion of the project based on the health check status of the project and based on second data relating to the one or more other projects,
the recommendation to alter the health check status to another health check status; and communicate, using a presentation module, with one or more other devices to perform a response action based on the recommendation.

2. The device of claim 1, where the one or more processors are further to:
provide a user interface identifying the health check status.

3. The device of claim 1, where the one or more processors are further to:
provide a user interface identifying the recommendation.

4. The device of claim 1, where the one or more processors are further to:
train a model of project management based on the historical data; and
where the one or more processors, when generating the recommendation, are to:
generate the recommendation based on the model of project management.

5. The device of claim 1, where the one or more processors are further to:
monitor the plurality of past projects to identify alterations to the plurality of past projects;
monitor the plurality of past projects to determine an effect of the alterations to the plurality of past projects; and
where the one or more processors, when generating the recommendation, are to:
generate the recommendation based on the effect of the alterations to the plurality of past projects.

6. The device of claim 5, where the one or more processors, when generating the recommendation, are to:
select an alteration of the alterations for the project.

7. The device of claim 1, where the one or more processors are further to:
parse the first data to generate a word cloud based on the first data; and
use a text processing technique to generate the alert based on the word cloud.

8. A method, comprising:
determining, by a device and before initiation of a project, a set of intervals for performing a project health check, the set of intervals corresponding to percentages of completion of the project;
detecting, by the device, a trigger to perform the project health check for the project,
where detecting the trigger comprises:
detecting satisfaction of an interval of the set of intervals;
obtaining, by the device, project data relating to the project,
the project data including:
first data associated with a plurality of other projects, and
second data associated with the project,
the project data include at least one of:
transactional data, ordering data,
log file data,
product classification data,
task classification data,
user skill proficiency data,
human resources data,
company data,
energy price data, or
computing resource price data;
selecting, by the device and from the plurality of other projects, one or more other projects associated with a threshold similarity score relating to a similarity with the project,
the threshold similarity score relating to similarity with regard to one or more of:
project type,
agile delivery type,
industry type,
geography, or
technology;
processing, by the device, the project data relating to the project to determine a health check status of the project based on predicting the trigger to perform the project health check for the project,
the health check status of the project being selected from a plurality of possible health check statuses for the one or more other projects;
generating, by the device, a recommendation relating to altering completion of the project based on the health check status of the project and based on the first data relating to the one or more other projects,
the recommendation to alter the health check status to another health check status; and
communicating, by the device, with one or more other devices to perform a response action based on the recommendation.

9. The method of claim 8, further comprising:
communicating with one or more other devices to cause a user interface to be provided for display,
the user interface including information identifying the health check status, the recommendation, and the response action.

10. The method of claim 8, further comprising:
providing a virtual agent functionality via a user interface,
the virtual agent functionality being to communicate the health check status or the recommendation using a natural language generation technique and to receive input associated with the project using a natural language processing technique.

11. The method of claim 8, where processing the project data to determine the health check status comprises:
predicting one or more delivery risks associated with one or more project milestones; and
where generating the recommendation comprises:
generating the recommendation to alter the project to mitigate the one or more delivery risks.

12. The method of claim 8, where the project is associated with one of:
an agile development delivery type,
an agile management delivery type,
a testing delivery type, or
a custom delivery type.

13. The method of claim 12, where processing the project data comprises:
processing third data relating to a subset of the plurality of other projects associated with a same delivery type as the project to generate a model for the same delivery type; and
determining the health check status based on the model.

14. The method of claim 8, where selecting the one or more other projects associated with the threshold similarity score relating to the similarity with the project comprises:
generating a threshold score for the one or more other projects associated with the threshold similarity score relating to the similarity with the project; and selecting the one or more other projects based on the threshold score.

15. A non-transitory computer-readable medium storing instructions, the instructions comprising:
one or more instructions that, when executed by one or more processors, cause the one or more processors to:
determine, before initiation of a project, a set of intervals for performing a project health check,
the set of intervals corresponding to percentages of completion of the project;
predict, based on historical data relating to a plurality of past projects, a trigger to perform the project health check for the project,
where the one or more instructions, that cause the one or more processors to predict the trigger, cause the one or more processors to:
predict satisfaction of an interval of the set of intervals;
select, from the plurality of past projects, one or more other projects associated with a threshold similarity score relating to a similarity with the project,
the threshold similarity score relating to similarity with regard to one or more of:
project type,
agile delivery type,
industry type,
geography, or
technology;
process project data relating to the project to determine a health check status of the project based on predicting the trigger to perform the project health check for the project,
the health check status of the project being selected from a plurality of possible health check statuses;
generate a recommendation relating to altering completion of the project based on the health check status of the project and based on second data relating to the one or more other projects,
the recommendation to alter the health check status to another health check status; and
communicate with one or more devices to provide information identifying the recommendation;
receive, from the one or more devices, response information relating to the recommendation; and
perform a response action relating to the recommendation based on receiving the response information.

16. The non-transitory computer-readable medium of claim 15, where the one or more instructions, that cause the one or more processors to receive the response information, further cause the one or more processors to:
receive response information identifying a user interaction with a user interface identifying the response action.

17. The non-transitory computer-readable medium of claim 15, where the one or more instructions, that cause the one or more processors to receive the response information, further cause the one or more processors to:
receive response information identifying a user interaction with a virtual agent provided via a user interface of the one or more devices.

18. The non-transitory computer-readable medium of claim 15, where the one or more instructions, when executed by the one or more processors, further cause the one or more processors to:
determine the health check status based on a prediction relating to a threshold,
the threshold relating to at least one of:
a quantity of errors,
a quantity of alerts,
a schedule deviation,
a budget deviation, or
a quantity of user complaints.

19. The non-transitory computer-readable medium of claim 15, where the one or more instructions, when executed by the one or more processors, further cause the one or more processors to:
parse the project data to generate a word cloud based on the project data; and
use a text processing technique to generate an alert based on the word cloud.

20. The non-transitory computer-readable medium of claim 15, where the one or more instructions, that cause the one or more processors to perform the response action, further cause the one or more processors to:
alter a resource selected for the project.

* * * * *